Nov. 2, 1965     T. R. OVERALL     3,215,102
APPARATUS FOR FABRICATING FRINGE MATERIAL
Original Filed Nov. 16, 1959     4 Sheets-Sheet 1

INVENTOR.
THOMAS R. OVERALL
BY
J. Gordon Angus
ATTORNEY

Nov. 2, 1965     T. R. OVERALL     3,215,102
APPARATUS FOR FABRICATING FRINGE MATERIAL
Original Filed Nov. 16, 1959     4 Sheets-Sheet 4

INVENTOR.
THOMAS R. OVERALL
BY
D. Gordon Angus
ATTORNEY

United States Patent Office 3,215,102
Patented Nov. 2, 1965

3,215,102
APPARATUS FOR FABRICATING FRINGE MATERIAL
Thomas R. Overall, Covina, Calif., assignor to Aerojet-General Corporation, Azusa, Calif., a corporation of Ohio
Original application Nov. 16, 1959, Ser. No. 853,301, now Patent No. 3,114,959, dated Dec. 24, 1963. Divided and this application Dec. 18, 1962, Ser. No. 262,282
6 Claims. (Cl. 112—64)

This is a divisional application of my copending application Serial No. 853,301, filed November 16, 1959, now U.S. Patent 3,114,959 issued December 24, 1963.

This invention relates to a novel fringe material and an apparatus for the fabrication thereof.

In those instances where a cloth-like material is used as insulation subjected to hot gases of combustion, it has been found that the insulation will be eroded at a much lower rate if all the cloth fibers or cords are parallel to each other and oriented radially to the gas flow and at some angle to the down-stream flow of the hot gases. If a conventional woven cloth is utilized, only some of the cords are at the proper angle to the hot gas flow while the other cords are parallel and at angles between perpendicular and parallel to the gas flow, and therefore they deteriorate more quickly. Further, in many applications it is desired to use a cloth which has been impregnated with various resinous materials. It is extremely difficult to weave or knit a cloth using pre-impregnated cord, as the fibers tend to be sticky in nature and adhere to each other. Because the weaving process is dependent upon displacement of cords to afford means of threading perpendicular cords through the interstices provided, it is seen to be most difficult to weave a fabric of material utilizing cords which tend to adhere to each other.

This invention provides a means for winding a continuous flat coil comprised of a plurality of parallel cords which may subsequently be compressed and cut to form a dense fringe. Other means for winding cord on a mandrel or spool employ a rotating mandrel and as a result there is a finite or fixed limit to the length of cord coil which may be fabricated imposed by the length of the rotating mandrel. In the present invention the cords are rotated about a fixed or non-rotating flat mandrel section, the coil formed by the cords being moved off the mandrel section as it is wound. As a result a continuous coil of cord containing no mandrel is formed, the length of the coil being limited only by the quantity of cord available and independent of the mandrel dimensions.

It is therefore the principal object of the present invention to provide improved means for fabricating cloth material in the form of a densely compressed fringe wherein all the cords in the fringe will be parallel.

Another object of this invention is to provide improved means for winding a densely compressed fringe of any desired thickness on a continuous basis from pre-impregnated cords.

And another object of this invention is to provide a novel compressed fringe, the cord members of which are all parallel, which has a surface composed entirely of end portions of said cords, and which is easily conformable to various contours.

In its broadest aspect, the invention comprises a novel cloth-like material and a means for fabricating it from a plurality of pre-impregnated cords arranged in a manner wherein all cords are parallel, thereby forming a fringe which may be densely compressed to a fringe of any desired thickness. A method of fabricating such a fringe comprises the steps of winding cords from a plurality of spools about a fixed, flat mandrel which is twice the width of the desired fringe. The cords are wound in a number of layers equal to the number of cord spools, the wound cords forming a coil. After being wound on the mandrel, the coil is continuously fed along the fixed mandrel to a point where it is cross-stitched. The coil is then removed from the mandrel, compressed, and cut through the center in a generally longitudinal direction, perpendicular to or at any desired angle to the direction of the parallel cords. The result is a fringe comprised of a plurality of parallel cords and having twice the number of layers as the number of cord spools. The fringe may be fabricated with or without wire members, which if present, assist in conforming the completed fringe to various contours.

These and other objects, features and aspects of the invention will be apparent to those skilled in the art from the following more detailed description taken together with the appended drawings, wherein:

FIG. 4a is a front elevation view of the novel mandrel of the apparatus of FIG. 3, while FIG. 4b is an enlarged top sectional view of the mandrel taken along section line B—B of FIG. 4a, drawn to double scale;

Figure 5:
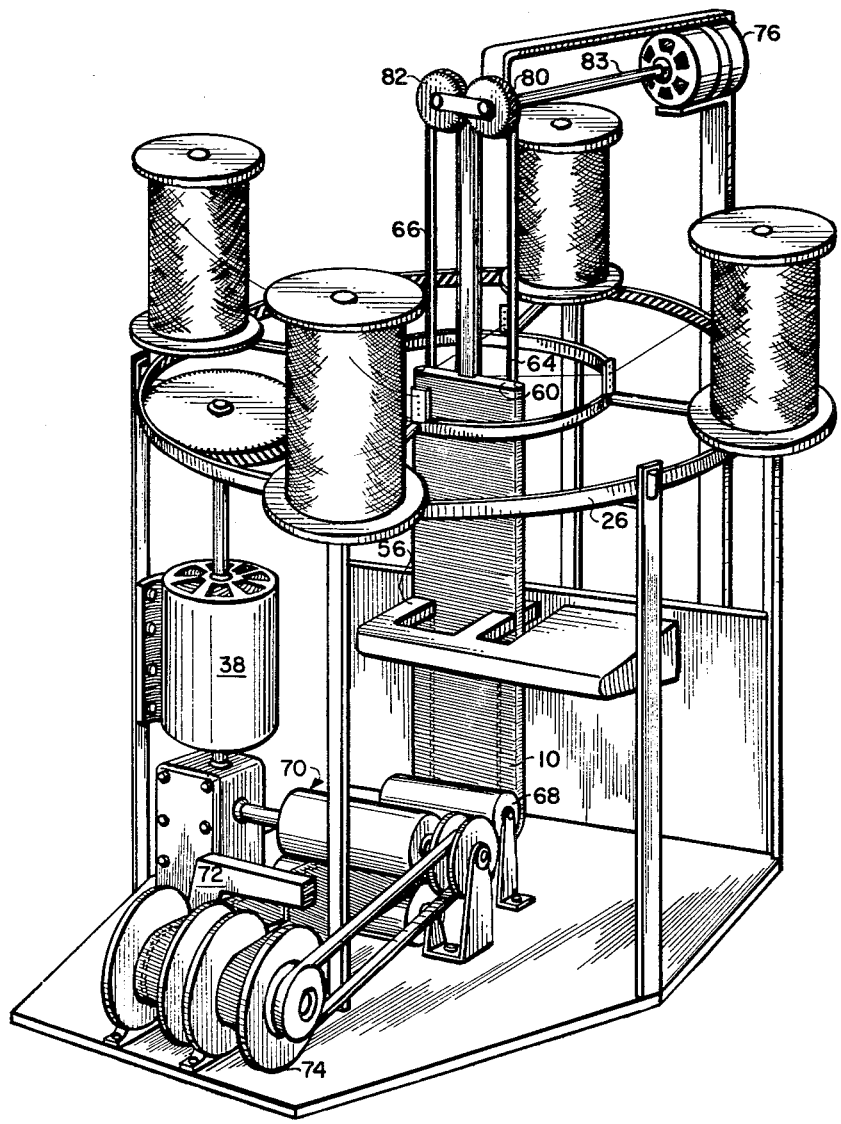
Figure 6A:
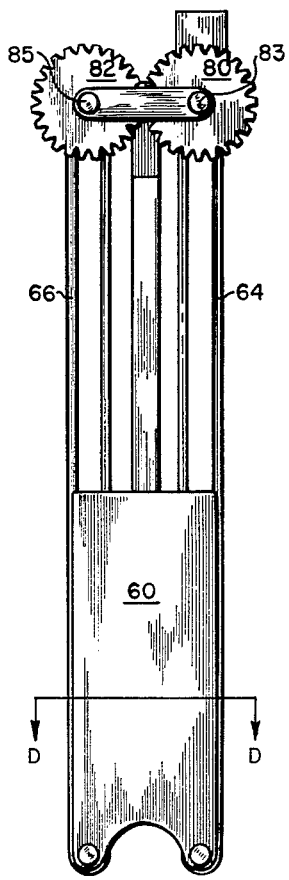
Figure 6B:
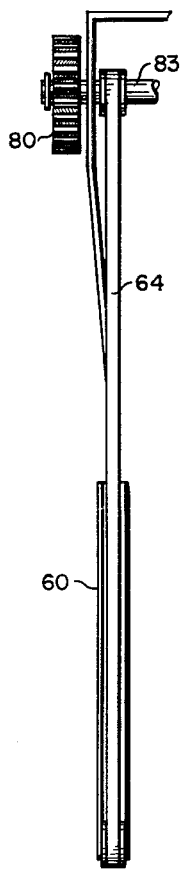
Figure 6C:
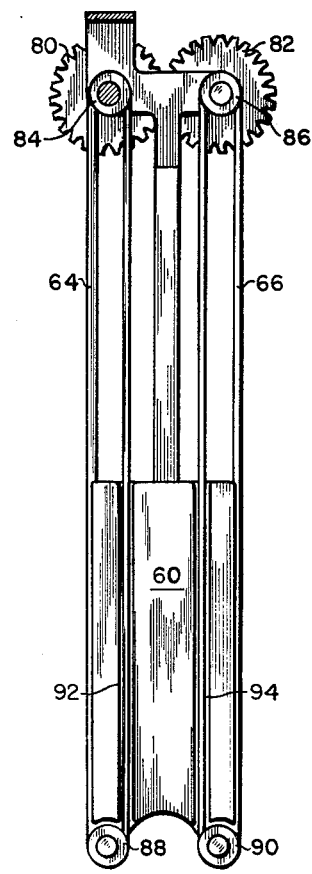
Figure 6D:
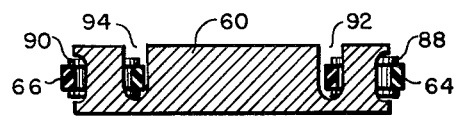

FIG. 5 shows an alternate embodiment for producing the fringe of the present invention without supporting wires contained therein; and, FIGS. 6a, 6b and 6c are front, side, rear views, respectively, of the novel mandrel and mandrel driving configuration used in the embodiment of FIG. 5 which enables fabrication of a fringe without supporting wires therein, while FIG. 6d is a sectional view of the mandrel proper taken on line D—D of FIG. 6a.

Figure 1:
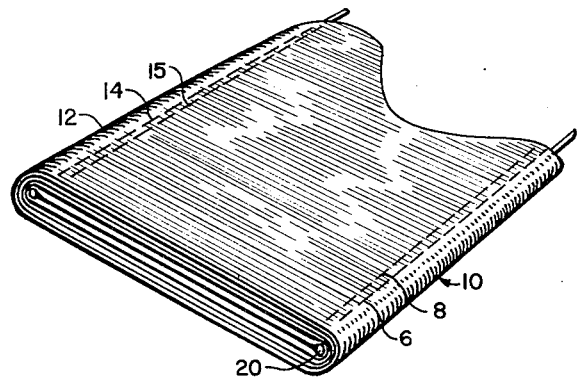
FIG. 1 is a fragmentary perspective view of the fringe produced by the present invention.
Figure 2:
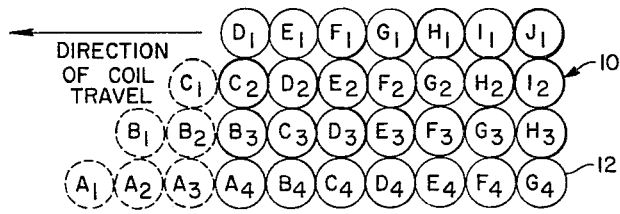
FIG. 2 is a schematic diagram of a fringe segment showing the parallel orientation of all cords within the fringe as laid on the top surface of the mandrel.

Referring now to FIGURES 1 and 2, there is shown in FIG. 1 a fragmentary perspective view of a portion of the thick continuous fringe in accordance with the present invention. The fringe 10 comprises a plurality of cords 12, which are seen to be parallel in alignment with respect to each other. The completed fringe is seen here to be eight layers deep, but as will be seen from succeeding figures, the number of layers desired can easily be determined by choice of the number of spools of cord employed in winding the fringe. The number of layers of cord in the completed fringe is equal to twice the number of cords laid in each sequence, half the depth of the fringe arising from the cord windings on the front surface of the mandrel and half the depth from the windings on the reverse surface.

Cross stitching is employed to hold together the cords 12 of the fringe 10. Two pair of stitch rows are provided, one on each side of the fringe, all four rows, 6, 8, 14 and 15, being parallel to each other and the longitudinal axis of the fringe and running in a direction perpendicular to the direction of the cord alignment. Each member of each pair is offset one-half stitch from the other member to provide a continuous interlocking of the cords. Thus, as seen from FIG. 1, row 6 is offset one-half stitch from row 8 while row 14 is offset one-half stitch from row 15. A pair of wire members 20 are provided, which, if left in the fringe 10, assist in conforming the completed fringe segment to any desired contour.

FIG. 2 illustrates schematically how the cords 12 of the fringe 10 are parallel to each other, providing a surface composed of perpendicular ends when the fringe 10 is cut along its longitudinal axis. Further reference will subsequently be made to FIG. 2 to explain the fabrication process.

Figures 4A, 4B:
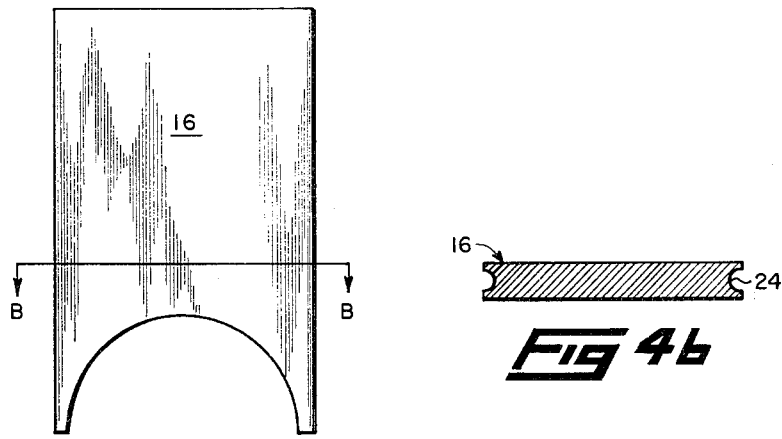
Figure 3:
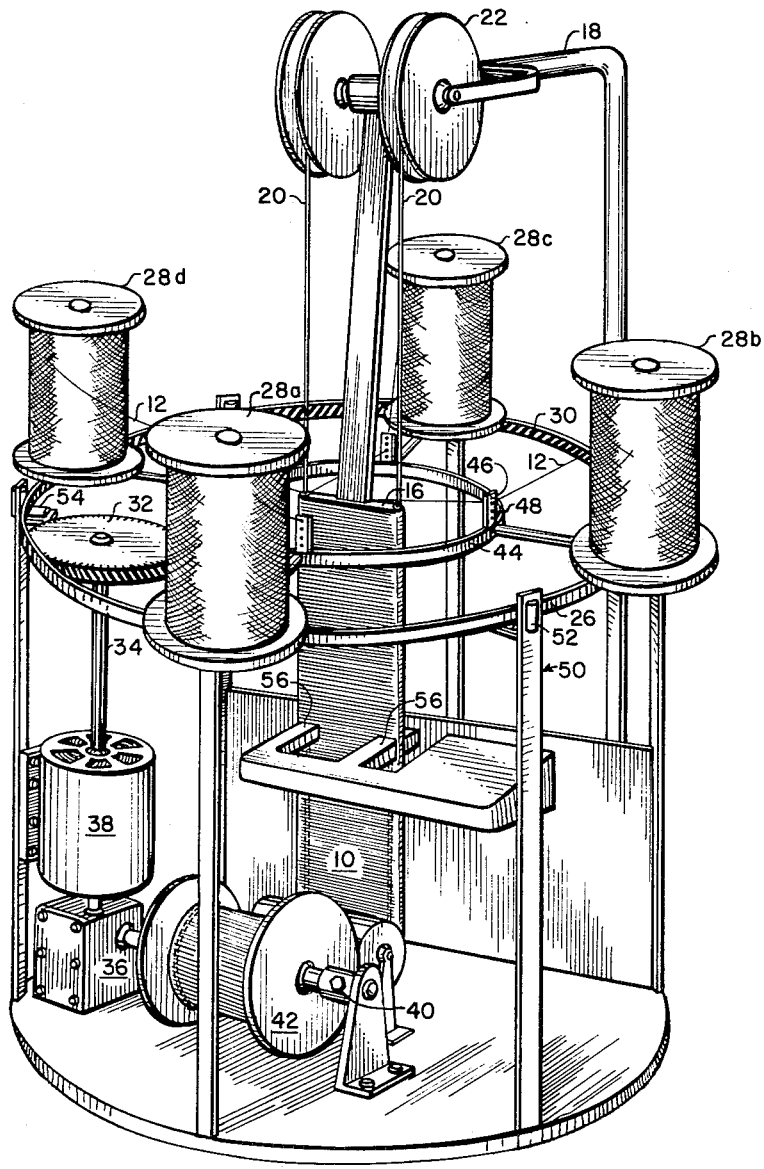
FIG. 3 shows an arrangement of an apparatus in accordance with this invention for making the fringe wherein the fringe produced contains a pair of supporting wires.

FIG. 3 illustrates one arrangement of apparatus that may be utilized to practice the process of fabricating the fringe of the present invention. A fixed winding mandrel 16, having twice the width of the desired fringe product, is suspended from an overhead beam 18 or secured in a similar manner by other means. The mandrel 16 serves as a form about which the cords 12 are wound and also serves to maintain the spacing of two parallel winding spindles or wires 20 which are fed from storage reels 22, also suspended from the overhead beam 18. The wires 20 continuously feed past the fixed mandrel 16 in a manner later described, seating in grooved tracks 24 on the opposite lateral sides of the mandrel 16, the tracks extending the length thereof. FIG. 4a illustrates the novel configuration of the mandrel 16, while the sectional view of FIG. 4b shows clearly the disposition of the grooved tracks 24 in the mandrel 16. As shown in FIG. 3, a wheel 26 containing a plurality of spools 28a, b, c, d, of cord 12, shown here as four spools, is arranged to rotate about the fixed mandrel 16. The wheel 26 has geared teeth 30 on the inner circumference thereof which engage drive gear 32. The drive gear 32 is coupled by drive shaft 34 to a power source 38, shown here to be an electric motor. The motor 38 is seen to drive a reduction gear box assembly 36 which rotates the lower collection spool 42, the latter serving to remove the completed fringe 10 from the apparatus after its fabrication. Removable sleeve means 40 are provided for removing the spool 42 from the shaft when it is full.

The ratios of the members of the reduction gear box assembly 36 are selected such that the parallel winding spindles or wires 20 are continuously fed past the fixed mandrel 16 at a rate equal to the diameter of one cord 12 per revolution of the rotating wheel 26. The rotation of the wheel 26 causes the cord spools 28 to rotate about their axes, feeding cords 12 through members 46 having guide holes 48 in the inner hoop 44 which is rigidly attached to the outer hoop 26, thereby laying cords over the moving spindles 20 and the fixed mandrel 16.

It is to be noted that a single one of each of the members 46 which contain guide holes 48 is associated with each spool 28. The members 46 are arranged in a manner that, beginning with the first spool 28a, the associated guide hole is located at a point which is one cord diameter higher than the guide hole associated with the next succeeding spool. Thus the guide hole associated with the second spool 28b is one cord diameter lower than that associated with first spool 28a and one cord diameter higher than that associated with third spool 28c. Similarly, the guide hole associated with the third spool 28c is one diameter lower than that associated with second spool 28b and one diameter higher than that associated with the fourth spool 28d, while that guide hole associated with fourth spool 28d is one diameter lower than that associated with the third spool 28c but three diameters lower than the guide hole associated with the first spool 28a. As will be later explained, such an arrangement insures that the cords will lie adjacent to one another on the mandrel 16 as shown, for example, by cords A1, A2, A3 and A4 in FIG. 2.

The rotating wheel 26 is mounted on support 50, riding on a series of lower bearings of the roller type 54, the wheel 26 being retained in place by a series of vertical roller bearings 52 arranged to bear on the smooth outer rim of the hoop 26 to secure it in a manner assuring proper and constant symmetry of rotation around the fixed mandrel 16.

In operation, actuation of the power source 38 causes rotation of collection spool 42, continuously moving parallel winding spindles or wires 20 from the storage reels 22 past the fixed mandrel 16 in the side grooves 24 thereof. Simultaneously the wheel 26 is caused to rotate about the mandrel 16, the wires 20 traveling a distance equal to one cord diameter for each rotation of the wheel 26. Wheel rotation causes the cords 12 to lie upon the mandrel 16 in the following manner. As shown in FIG. 2, which is a schematic diagram of the cords as they are laid on the top of the mandrel, cord A1 from the first spool 28a is placed upon the mandrel 16 followed by cord A2 from the second spool 28b adjacent thereto. Cord A3 from the third spool 28c is placed adjacent to cord A2 from the second spool 28b, and cord A4 from the fourth spool 28d adjacent to the cord A3 from the third spool 28c. Placement of the fourth cord A4 indicates a complete revolution of the wheel 26 together with a downward movement on the mandrel 16 of the wires 20 a distance equal to one cord diameter. With the next revolution of the wheel 26, cord B1 from the first spool 28a is placed above the 1st cord A2 from the second spool 28b, as the windings or coil of cord has been carried downwardly one cord diameter by the movement of the wires 20. Thus, cord B2 from the second spool 28b lies above the first cord A3 from the third spool 28c. Cord B3 from the third spool 28c lies above cord A4 from the fourth spool 28d, while the cord B4 from the fourth spool lies flat on the mandrel 16 adjacent to the first lap A4 from the fourth spool. The coil has now moved downwardly on the mandrel 16 a distance equal to another cord diameter and, as seen from FIG. 2, the third laps C1, C2 from the first and second spools lie above the second laps B2, B3, from the second and third spools, respectively, while the third lap C3 from the third spool lies adjacent to the second lap B3 from the third spool and above the second lap B4 from the fourth spool. The third lap C4 from the fourth spool lies flat on the mandrel adjacent to the second lap B4 from the fourth spool. The coil has now moved downwardly yet another cord diameter. The fourth lap D1 from the first spool now lies above the third lap C2 from the second spool. The fourth lap D2 from the second spool lies adjacent to the third lap C2 from the second spool and above the third lap C3 from the third spool, and the fourth lap D3 from the third spool lies adjacent to the third lap C3 from the third spool and above the third lap C4 from the fourth spool.

Commencing with the fourth lap, a four layer coil is produced. The fifth lap E1 from the first spool lies above the fourth lap D2 from the second spool. The fifth lap E2 from the second spool lies above the fourth lap D3 from the third spool, etc. Thus, as the layers move downwardly with the wires 20, a continuous four layer coil is produced. The resulting coil, considering the cords on both sides of the mandrel 16, has a number of layers of cords in side-by-side relationship equal to twice the number of cords wound about the mandrel during each rotating cycle. In other words, N/2 cords are wound around the mandrel, where N is any even number and equals the total number of layers of cord of finished dense fringe, there being eight of such layers shown in the fringe 10 in FIGURE 1 of the drawings.

Referring again to FIG. 3, the double width coil with the wires 20 located within, feeds off the mandrel 16 to a position where a pair of parallel sewing machine heads 56 stitch the coil interiorly of the spindles or wires 20. The needles of the heads are lubricated in order to easily stitch the pre-impregnated cords which may have a tendency to stick or cling together. A silicone base lubricant is preferred, but care must be exercised to ascertain that the lubricant used is non-reactive with the material impregnating the cords. The completed double width coil then winds about lower collection spool 42. When the collection spool 42 is filled, it may be removed from the machine and the coil thereon compressed and cut at any desired angle by hand or machine operation to form a fringe 10. The wires 20 may be left within the fringe 10 or pulled out as desired. It is seen that by cutting the completed coil longitudinally through the center, a fringe material is produced which has one surface composed entirely of cord ends, as shown in FIG. 2.

FIG. 5 illustrates an alternative arrangement of an apparatus for making the fringe in accordance with the present invention. This configuration of apparatus is generally similar to that shown in FIG. 3, however a fixed mandrel 60 is employed wherein the coil may be continuously removed by means of a pair of continuous driving belts 64, 66, the fringe 10 being fabricated without wires located therein. Another feature of this embodiment of the invention is the provision of automatic compressing and cutting means whereby the fringe is fabricated, compressed and cut in one continuous operation.

The novel mandrel and mandrel driving arrangement whereby the fringe may be fabricated without supporting wires is shown in detail in FIGS. 6a, 6b and 6c which are front, side and rear views, respectively, of the mechanism, and FIG. 6d which is a sectional view of the mandrel proper drawn to twice the scale of FIGS. 6a, 6b and 6c. Thus, an auxiliary power source, shown in FIG. 5 as an electric motor 76 imparts a rotational movement to mandrel drive gear 80 through drive shaft 83. The views of FIG. 6 illustrate that a clockwise movement imparted to the mandrel drive gear 80 (as seen from FIG. 6a, the front view), will cause a counter-clockwise movement of a second mandrel gear 82, the teeth of which are arranged to mesh with the teeth of the drive gear 80. Shafts 83, 85 are arranged centrally through the gears 80, 82, respectively, belt pulleys 84, 86 being arranged on the opposite ends of said shafts. A first drive belt 64 is run from the pulley 84 coupled to the drive gear 80, running along the side of the mandrel 60 around a terminal pulley 88 at the bottom of the mandrel 60 and back to the pulley 84 in channel or belt groove 92. Similarly, a second drive belt 66 runs around the pulley 86 coupled to the second mandrel gear 82 along the other lateral edge of the mandrel 60, around another terminal pulley 90 at the bottom of the mandrel 60, and back to the pulley 86 through channel or belt groove 94. A clockwise rotation of the drive gear 80 and counter-clockwise rotation of the second gear 82 will cause a continuously downward movement of the belts 64, 66 along the lateral edges of the mandrel 60. As previously explained, the motor speeds and gear ratios are selected so that a single rotation of the spool-carrying wheel 26 will coincide with a downward movement of the belts equal to a distance of one cord diameter. It is not essential that the arrangement of FIGS. 6a, 6b, 6c be used. Alternatively, a single belt in a figure eight configuration would produce a downward movement along the sides of the mandrel if looped about four pulleys, one in each of the four corners of the mandrel. Grooved diagonal paths on the pulley side of the mandrel may be utilized to recess the crossed moving belt.

Referring again to FIG. 5, the cord is wound about the fixed mandrel 60 and the moving belts 64, 66 and removed from the mandrel 60 in the same manner as previously described in connection with FIGS. 2 and 3. After stitching by sewing machine heads 56, the coil moves under lower drive roller 68 where it is then fed to compression machinery comprising a pair of heavy rollers 70 which serve to compress it to the desired density. The compressed coil is then fed to a bandsaw 72 which cuts it continuously through the center providing two fringe portions, each having one surface composed entirely of end portions of cord. The two portions are collected on collection reels 74 which may also be powered by the prime power source 38.

What has been shown is the production of a thick fringe comprised of pre-impregnated cords on an automatic basis, the resultant fringe being of a nature that it may be cut at any angle to provide a high density flame resistant surface composed entirely of perpendicular cord ends. The apparatus shown may be employed to fabricate continuous lengths of fringe, weather stripping, brooms, mops, and brushes or the like, from any material preferably available in continuous lengths. Such apparatus may be employed to fabricate these items from cotton, nylon, fiberglass, wire made of steel, copper or aluminum, or any combination of these materials or materials of a like or similar nature. Further, the apparatus will satisfactorily process untreated cords or cords which have been pre-impregnated with various materials to alter the characteristics thereof, such as sticky or wax-like resins.

While it is preferable that all the cords utilized be of substantially equal diameter to assure a smooth flat fringe, the apparatus disclosed will be operative to form a fringe if cords of differing or varying diameters, such as rope, were used, although the completed fringe might not be as regular in appearance as when cords of substantially equal diameter are used.

While a number of details of construction have been illustrated and described, alternatives and equivalents will occur to those skilled in the art which are within the scope and spirit of this invention. It is therefore desired that the protection be not limited to the details herein illustrated and described, but only by the proper scope of the appended claims.

I claim:

1. An apparatus for making fringe material comprising: a fixed mandrel having a flat upper surface, a lower surface having a pair of grooves arranged therein, said mandrel also having first and second lateral edges, each lateral edge having a groove extending the length thereof; a circular hoop having an axis of rotation coinciding with the longitudinal axis of said mandrel and adapted to rotate about said mandrel; a plurality of cord storage means mounted on said hoop equidistant from one another on the periphery of said hoop; mandrel support means affixed to said mandrel at the topmost portion thereof; two rotatable shaft members mounted on said mandrel support means, one of said rotatable shaft members being adapted to be connected to an external power source providing rotational movement therefor; a gear member arranged on one end of each shaft member, said gear members directly meshing whereby rotation in a given direction of the gear member on the shaft member adapted to be connected to an external power source will cause rotation of the other gear member in an opposite direction; a pulley member adapted to receive a belt mounted on each of said shaft members on the opposite side of said mandrel support means from said gear members; a rotatable shaft mounted in each of the two lowermost corners of said mandrel; a pulley adapted to receive a belt mounted on each of said shafts; said pulley members and said pulleys being substantially coplanar; a first continuous belt arranged to travel in the sequence named, from one of said pulley members through the groove in one of the lateral edges of said mandrel, then around the pulley located at one of the two lowermost corners of said mandrel, then back to said one pulley member through one of the grooves in the lower surface of said mandrel; and, a second continuous belt arranged to travel in the sequence named, from the other of said pulley members through the groove in the other lateral edge of said mandrel, then around the other pulley located at the other lowermost corner of said mandrel, then back to said other pulley member through the other of the grooves in the lower surface of said mandrel; whereby a rotational movement imparted to said one shaft member adapted to be connected to an external power source will cause the portions of the first and second belts traveling in the grooves in the opposite lateral edges of said mandrel to move in the same direction; a plurality of cord guide means arranged to rotate in synchronism with said hoop and to guide cords from said plurality of cord storage means to wrap cords about said mandrel and said first and second continuous belts in the grooves provided in the lateral edges and the lower surface thereof, said plurality of cord guide means being respectively associated with a corresponding one of said plurality of cord storage means, said plurality of cord guide means laying cords from said plurality of cord storage means in a sequential side-by-side relationship on said mandrel to form a cord coil; means for synchronously rotating said hoop a full 360 degrees for each increment of belt travel which is equal to the diameter of a single cord, thereby advancing each of said cords in said cord coil a similar distance along said mandrel; and stitching means adapted to sew retaining stitches in said cord coil as it moves off the mandrel, said stitches running in a direction transverse to that of the cords in the cord coil.

2. A mandrel assembly for use in fringe winding apparatus comprising: a fixed mandrel having a flat upper surface, a lower surface having a pair of grooves arranged therein, and first and second lateral edges, each lateral edge having a groove extending the length thereof; mandrel support means affixed to said mandrel at the topmost portion thereof; two rotatable shaft members mounted on said mandrel support means, one of said shaft members being adapted to be connected to an external power source providing rotational movement therefor; a gear member arranged on one end of each shaft member, said gear members directly meshing whereby rotation in a given direction of the gear member on the shaft member adapted to be connected to an external power source will cause rotation of the other gear member in an opposite direction; a pulley member adapted to receive a belt mounted on each of said shaft members on the opposite side of said mandrel support means from said gear members, a rotatable shaft mounted in each of the two lowermost corners of said mandrel; a pulley adapted to receive a belt mounted on each of said shafts; said pulley members and said pulleys being substantially coplanar; a first continuous belt arranged to travel in the sequence named, from one of said pulley members through the groove in one of the lateral edges of said mandrel, then around the pulley located at one of the two lowermost corners of said mandrel, then back to said one pulley member through one of the grooves in the lower surface of said mandrel; and, a second continuous belt arranged to travel, in the sequence named, from the other of said pulley members through the groove in the other lateral edge of said mandrel, then around the other pulley located at the other lowermost corner of said mandrel, then back to said other pulley member through the other of the grooves in the lower surface of said mandrel; whereby a rotational movement imparted to said one shaft member adapted to be connected to an external power source will cause the portions of the first and second belts traveling in the grooves in the opposite lateral edges of said mandrel to travel in the same direction.

3. In an apparatus for making fringe material, a substantially flat fixed mandrel, a rotatable circular hoop extending about said mandrel and having an axis of rotation coinciding with the longitudinal axis of said mandrel, a plurality of cord storage means mounted on said hoop equidistant from one another on the periphery thereof, a plurality of cord guide means arranged to rotate in sychronization with said hoop and respectively corresponding to said plurality of cord storage means to guide cords from said plurality of cord storage means for wrapping cords about said mandrel, each of said plurality of cord guide means comprising a guide member having a plurality of guide holes provided therethrough and arranged in longitudinally spaced relationship along a line extending parallel to and in the same direction as the longitudinal axis of said mandrel, the number of guide holes in each guide member being equal to the number of cord storage means comprising said plurality of cord storage means, adjacent guide holes in each respective guide member being spaced apart a distance adapted to be substantially equal to the diameter of a single cord, whereby an individual cord from each cord storage means may be passed through a guide hole in the guide member corresponding thereto with all of the cords from said plurality of cord storage means being received through guide holes located at progressively different relative positions in said guide members, and means for rotating said hoop and said guide members for laying cords from said plurality of cord storage means through the respective guide holes in said guide members on said mandrel is sequential side-by-side relationship to form a cord coil.

4. In an apparatus for making fringe material, a substantially flat fixed mandrel, a rotatable circular hoop extending about said mandrel and having an axis of rotation coinciding with the longitudinal axis of said mandrel, a plurality of cord storage means mounted on said hoop equidistant from one another on the periphery thereof, a plurality of cord guide means arranged to rotate in synchronization with said hoop and respectively corresponding to said plurality of cord storage means to guide cords from said plurality of cord storage means for wrapping cords about said mandrel, each of said plurality of cord guide means comprising a guide member having a plurality of guide holes provided therethrough and arranged in longitudinally spaced relationship along a line extending parallel to and in the same direction as the longitudinal axis of said mandrel, the number of guide holes in each guide member being equal to the number of cord storage means comprising said plurality of cord storage means, adjacent guide holes in each respective guide member being spaced apart a distance adapted to be substantially equal to the diameter of a single cord, whereby an individual cord from each cord storage means may be passed through a guide hole in the guide member corresponding thereto with all of the cords from said plurality of cord storage means being received through guide holes located at progressively different relative positions in said guide members, the inner surface of said hoop having a continuous circumferential series of gear teeth provided thereon, a drive gear wheel disposed within said hoop in meshing engagement with a portion of said gear teeth on the inner surface of said hoop, and means for rotating said drive gear wheel to impart rotation to said hoop and said guide members for laying cords from said plurality of cord storage means through the respective guide holes in said guide members on said mandrel in sequential side-by-side relationship to form a cord coil.

5. In an apparatus for making fringe material, a substantially flat fixed mandrel, a rotatable circular outer hoop extending about said mandrel and having an axis of rotation coinciding with the longitudinal axis of said mandrel, a plurality of cord storage means mounted on said outer hoop equidistant from one another on the periphery thereof, a circular inner hoop concentric with said outer hoop and extending about said mandrel in spaced radial alignment with said outer hoop, means connecting said inner hoop to said outer hoop for rotation therewith, a plurality of cord guide members mounted on said inner hoop and extending outwardly therefrom in parallel relationship to said mandrel, said guide members respectively corresponding to said plurality of cord storage means to guide cords from said plurality of cord storage means for wrapping cords about said mandrel, each of said guide members having a plurality of guide holes provided therethrough and arranged in longitudinally spaced relationship along a line extending parallel to and in the same direction as the longitudinal axis of said mandrel, the number of guide holes in each guide member being equal to the number of cord storage means comprising said plurality of cord storage means, adjacent guide holes in each respective guide member being spaced apart a distance adapted to be substantially equal to the diameter of a single cord, whereby an individual cord from each cord storage means may be passed through a guide hole in the guide member corresponding thereto with all of the cords from said plurality of cord storage means being received through guide holes located at progressively different relative positions in said guide members, the inner surface of said outer hoop having a continuous circumferential series of gear teeth provided thereon, a drive gear wheel disposed between said outer and inner hoops in meshing engagement with a portion of said gear teeth on the inner surface of said outer hoop, and means for rotating said drive gear wheel to impart rotation to said outer hoop and said inner hoop for laying cords from said plurality of cord storage means through the respective guide holes in said guide members on said mandrel in sequential side-by-side relationship to form a cord coil.

6. An apparatus for making fringe material comprising: a substantially flat fixed mandrel, a rotatable circular outer hoop extending about said mandrel and having an axis of rotation coinciding with the longitudinal axis of said mandrel, a plurality of cord storage means mounted on said outer hoop equidistant from one another on the periphery thereof, a circular inner hoop concentric with said outer hoop and extending about said mandrel in spaced radial alignment with said outer hoop, means connecting said inner hoop to said outer hoop for rotation therewith, a plurality of cord guide members mounted on said inner hoop and extending outwardly therefrom in parallel relationship to said mandrel, said guide members respectively corresponding to said plurality of cord storage means to guide cords from said plurality of cord storage means for wrapping cords about said mandrel, each of said guide members having a plurality of guide holes provided therethrough and arranged in longitudinally spaced relationship along a line extending parallel to and in the same direction as the longitudinal axis of said mandrel, the number of guide holes in each guide member being equal to the number of cord storage means comprising said plurality of cord storage means, adjacent guide holes in each respective guide member being spaced apart a distance adapted to be substantially equal to the diameter of a single cord, whereby an individual cord from each cord storage means may be passed through a guide hole in the guide member corresponding thereto with all of the cords from said plurality of cord storage means being received through guide holes located at progressively different relative positions in said guide members, the inner surface of said outer hoop having a continuous circumferential series of gear teeth provided thereon, a drive gear wheel disposed between said outer and inner hoops in meshing engagement with a portion of said gear teeth on the inner surface of said outer hoop, means for rotating said drive gear wheel to impart rotation to said outer hoop and said inner hoop for laying cords from said plurality of cord storage means through the respective guide holes in said guide members on said mandrel in sequential side-by-side relationship to form a cord coil, means to move the cord coil along said mandrel in timed synchronization with the rotation of said outer and inner hoops, and stitching means for sewing retaining stitches in the cord coil running in a direction transverse to the direction of the cords in the cord coil as the cord coil is moved off of said mandrel.

References Cited by the Examiner

UNITED STATES PATENTS

| | | | |
|---|---|---|---|
| 645,236 | 3/00 | Schlegel | 112—64 |
| 1,645,884 | 10/27 | Thomas et al. | 57—13 X |
| 1,708,537 | 4/29 | Fredrickson | 57—13 X |
| 1,734,705 | 11/29 | Yancey | 57—13 |
| 1,855,763 | 4/32 | Kranz et al. | 112—64 |
| 1,943,716 | 1/34 | Bardsley | 57—13 X |
| 2,748,448 | 6/56 | Menzier et al. | 28—78 |
| 2,757,437 | 8/56 | Faris et al. | 28—78 |

FOREIGN PATENTS 500,199   1/30   Germany.

JORDAN FRANKLIN, *Primary Examiner.*

RUSSELL C. MADER, *Examiner.*